United States Patent [19]

Heep et al.

[11] Patent Number: 4,909,676
[45] Date of Patent: Mar. 20, 1990

[54] APPARATUS FOR PNEUMATICALLY CONVEYING BULK MATERIAL

[75] Inventors: Dieter Heep, Bergatreute; Norbert Eberhard, Ertingen; Hans Hoppe, Vogt; Reinhard Ernst; Robert Storf, both of Weingarten, all of Fed. Rep. of Germany

[73] Assignee: Waeschle Maschinenfabrik GmbH, Ravensburg, Fed. Rep. of Germany

[21] Appl. No.: 187,423

[22] Filed: Apr. 28, 1988

[30] Foreign Application Priority Data

May 5, 1987 [DE] Fed. Rep. of Germany ....... 3714923

[51] Int. Cl.⁴ .................... B65G 53/66; B65G 53/04
[52] U.S. Cl. ........................................ 406/14; 406/11; 406/15; 406/94; 406/95
[58] Field of Search ............... 406/11, 14, 15, 19, 406/45, 85, 93–95

[56] References Cited

U.S. PATENT DOCUMENTS

| 3,295,896 | 1/1967 | Hurtig et al. | 406/15 |
| 3,929,379 | 12/1975 | Krambrock | 406/95 |
| 4,067,622 | 1/1978 | Krambrock et al. | 406/94 X |
| 4,389,143 | 6/1983 | Nadin et al. | 406/45 X |
| 4,515,503 | 5/1985 | Snowdon | 406/11 |
| 4,715,748 | 12/1987 | Krambrock | 406/14 |

FOREIGN PATENT DOCUMENTS

| 449393 | 9/1927 | Fed. Rep. of Germany | 406/95 |
| 2305030 | 8/1974 | Fed. Rep. of Germany | 406/95 |
| 2550164 | 5/1977 | Fed. Rep. of Germany | |
| 2219199 | 12/1977 | Fed. Rep. of Germany | 406/14 |
| 3323739 | 1/1985 | Fed. Rep. of Germany | |
| 3435907 | 4/1986 | Fed. Rep. of Germany | |
| 212526 | 12/1983 | Japan | 406/94 |
| 18635 | 1/1986 | Japan | 406/95 |
| 698870 | 11/1979 | U.S.S.R. | 406/95 |
| 2085388 | 4/1982 | United Kingdom | 406/14 |
| 2205293 | 12/1988 | United Kingdom | 406/94 |

Primary Examiner—Joseph F. Peters, Jr.
Assistant Examiner—James M. Kannofsky
Attorney, Agent, or Firm—Henry M. Feiereisen

[57] ABSTRACT

An apparatus for pneumatically conveying bulk material includes a conveyor line for transporting the bulk material and a secondary line which carries clean gas and is sectionized by spaced three-way/two-way directional control valves. Each control valve is actuated by a pressure transmitter which compares the actual pressure in the conveyor line with the desired pressure in a third line carrying a fluid at a desired pressure decreasing in downstream direction in accordance with the pressure drop in the conveyor line during normal operation. A communication between the conveyor line and the second line is provided by respective branch lines which define the third connection of the control valves and are multiply connected to the conveyor line. Thus, upon encountering a pressure drop in an area of the conveyor line, the respective pressure transmitter actuates the pertaining control valve which shuts off downstream section of the second line and connects the second line with the conveyor line for introducing clean gas into the conveyor line at the desired area thereof.

7 Claims, 2 Drawing Sheets

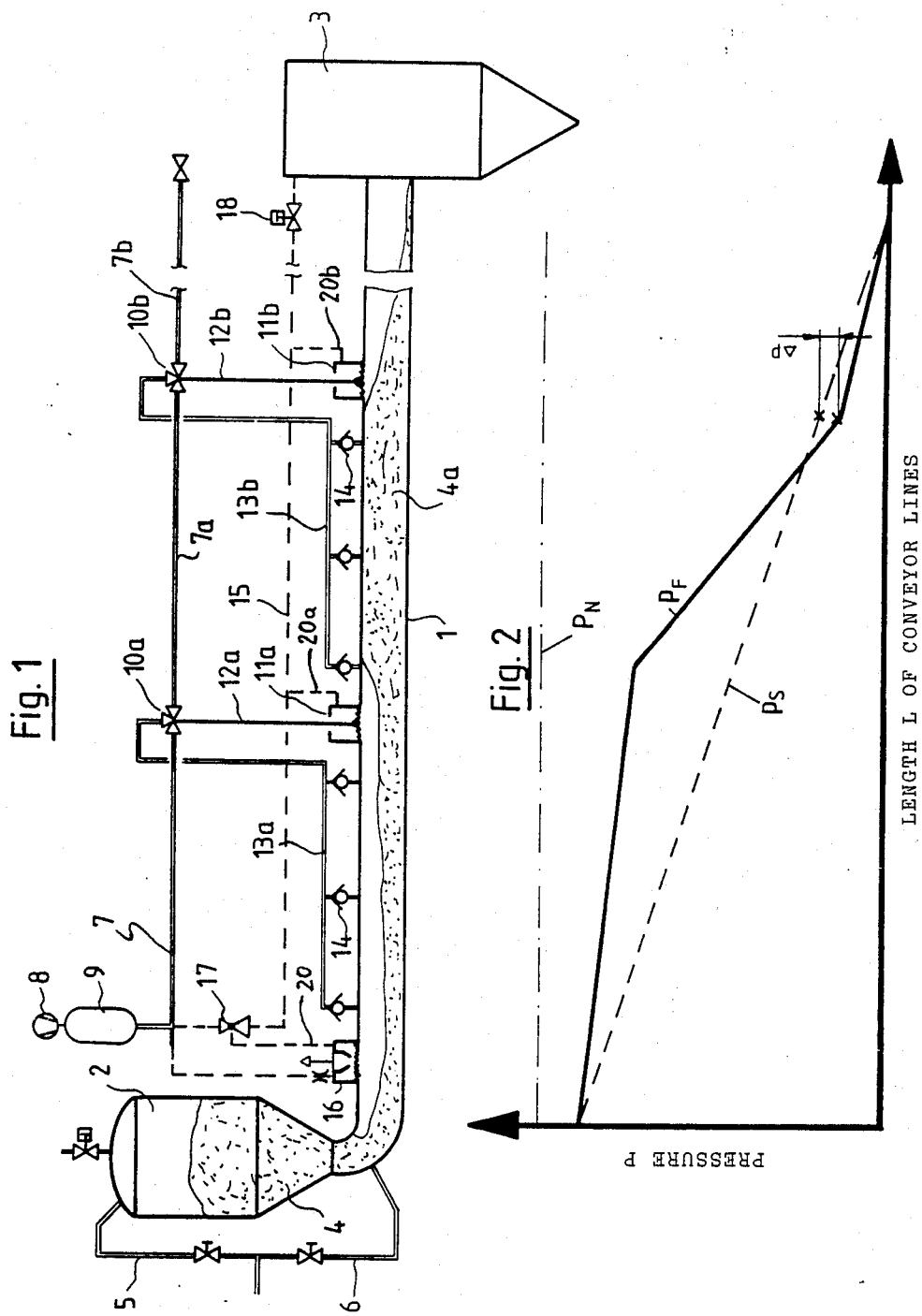

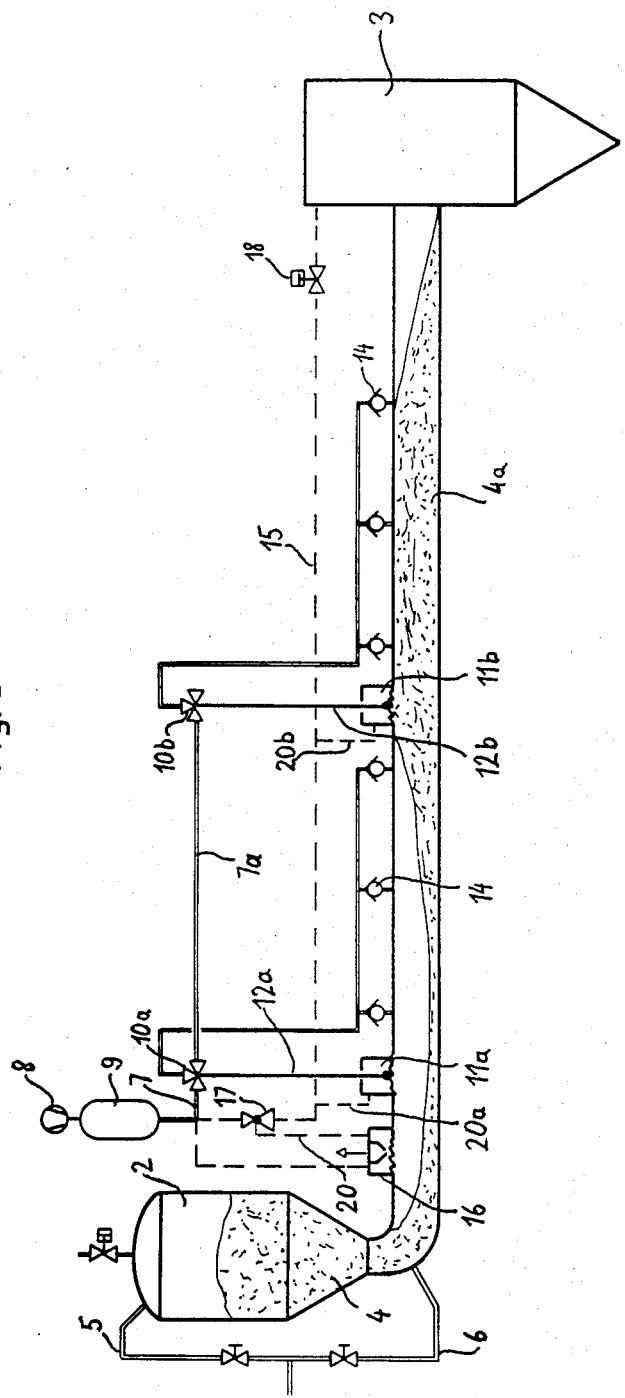

APPARATUS FOR PNEUMATICALLY CONVEYING BULK MATERIAL

BACKGROUND OF THE INVENTION

The present invention refers to an apparatus for pneumatically conveying bulk material.

An apparatus of this kind is known from German patents Nos. DE-PS 23 05 030 and DE-PS 25 50 164 and includes a conveyor line for transporting the bulk material and a secondary line guiding a clean gas and being subdivided in sections which are separated from each other by shut-off valves. Each shut-off valve is controlled by a pressure transducer which compares the actual pressure in the conveyor line with a desired pressure and actuates the respective shut-off valve at a pressure drop in the conveyor line by cutting off the downstream part of the secondary line so as to allow clean gas to be introduced from the secondary line into the conveyor line.

Such an apparatus permits a transport of the material in a slow and careful manner within the conveyor line at considerably charge of the conveying air flow since the pressure drop occurring downstream of the clogged area or of the beginning clogged area in the conveyor line is detected, and additional clean gas is fed into the conveyor line from the secondary line to dissolve the excessive material accumulation. According to these German patents, the pressure in the secondary line matches the pressure in the conveyor line during normal undisturbed operation. In the simplest case, the beginning of the secondary line is connected with the beginning of the conveyor line while the end of the secondary line is connected to the end of the conveyor line.

In the German patent no. DE-PS 23 05 030, the shut-off valves are designed as three-way/two-way directional control valves, with the third connection communicating with the conveyor line. Moreover, each shut-off valve includes a pressure transducer which switches over the three-way/two-way directional control valve at a pressure drop within the conveyor line in such a manner that the secondary line is shut-off downstream and the connection to the conveyor line is opened. Shut-off valves of this type are required in a great number and are relatively complicated and, moreover, tend to malfunction after a certain operating period because dusty bulk material from the conveyor line penetrates into the shut-off valve and into the secondary line. Such penetration cannot be eliminated even when providing a filter.

The German patent no. DE-PS 25 50 164 attempts to avoid this drawback by providing instead of the three-way/two-way directional control valves simple shut-off valves which are structurally combined with a pressure transducer. For introducing clean gas into the conveyor line, the secondary line sections arranged between the considerably spaced shut-off valves are connected with the conveyor line via suitably spaced check valves. Although these check valves may prevent a penetration of bulk material from the conveyor line into the secondary line, they can open only when the pressure difference between the secondary line and the conveyor line is sufficient to overcome the force of the valve spring. Moreover, since the pressure in the secondary line is adjusted to the pressure prevailing in the conveyor line during normal operation, the pressure available for feeding clean gas decreases in the secondary line from its beginning to its end.

The German patent no. DE-PS 33 23 739 and the German publication DE-OS 34 35 907 propose to avoid this drawback by providing a secondary line in which the pressure of the clean gas remains essentially constant and which is connected with the conveyor line via differential pressure controlled valves. The feeding of clean gas into the conveyor line is provided in dependence on the increase of the pressure difference between adjoining valves which are connected via respective lines.

These apparatuses thus have essentially the same drawback as the previously mentioned German patent no. DE-PS 23 05 030 and require complicated and specially designed valves which must be spaced from each other by a length corresponding to the length of the clogged area in order to ensure a dissolution of the clogged area, and thus must be provided in a great number.

SUMMARY OF THE INVENTION

It is thus a principal object of the present invention to provide an improved apparatus for pneumatically conveying bulk material obviating the afore-stated drawbacks.

This object and others which will become apparent hereinafter are attained in accordance with the present invention by providing a pressure line which carries a fluid at a desired pressure decreasing in downstream direction in accordance with the pressure drop in the conveyor line during normal operation and which is operatively connected to pressure transmitters spaced in downstream direction of the conveyor line for comparing the actual pressure in the conveyor line and the desired pressure in the desired pressure line. The pressure transmitters cooperate with three-way/two-way directional control valves which are incorporated in a thus sectionized, clean gas carrying secondary line and whose third connections are defined by branch lines which are multiply connected with the conveyor line so as to allow a selective connection of the secondary line with the conveyor line.

The present invention is thus based on the teaching of combining a desired pressure line with simple pressure transmitters which compare the desired pressure with the actual pressure in the conveyor line and switch associated three-way/two-way directional control valves in suitable manner by mechanical or electrical means to allow clean gas to flow from the secondary line to the appropriate location of the conveyor line. The pressure transmitters may be diaphragm gages or bellows gages so that deposits of bulk material may not impair the operation thereof.

Advantageously, the pressure transmitters and the pertaining directional control valves can be arranged at relatively great distance from each other e.g. between the tenfold or hundredfold of the diameter of the conveyor line or conveyor pipe. Solely the connection between the branch lines and the conveyor line should be provided at distances which are smaller than the length of a critical clogged area.

The provision of a separate and continuous desired pressure line is advantageous as the secondary line can carry clean gas at constant pressure so that the full pressure for introduction of clean gas into the conveyor line is available also at the end of the secondary line. Moreover, the constant pressure in the secondary line may be selected at any desired level and may be higher than the highest conveying pressure at the beginning of the conveyor line.

Preferably, the branch lines are connected to the conveyor line via a plurality of check valves which allow a flow of clean gas only in direction to the conveyor line.

BRIEF DESCRIPTION OF THE DRAWING

The above and other objects, features and advantages of the present invention will now be described in more detail with reference to the accompanying drawing in which:

FIG. 1 is a schematically simplified view of a first embodiment of an apparatus for pneumatically conveying bulk material in accordance with the present invention;

FIG. 2 is a graphical illustration of the pressure plotted over the length of pipe lines; and FIG. 3 is a schematically simplified view of a second embodiment of an apparatus for pneumatically conveying bulk material in accordance with the present invention.

DETAILED DESCRIPTION OF PREFERRED EMBODIMENT

Referring now to the drawing, and in particular to FIG. 1, there is shown a schematically simplified and considerably shortened view of a first embodiment of an apparatus for pneumatically conveying bulk material in accordance with the present invention. The apparatus includes a conveyor line 1 which connects a feed container 2 with a separator 3. The container 4 is charged with bulk material 4, and air is admitted from atop to force the bulk material 4 through the outlet of the funnel-shaped bottom of the container 2. A further line 6 communicates with the outlet of the container 2 to introduce compressed air for transporting the bulk material 4 through the conveyor line 1.

Extending parallel to the conveyor line 1 is a secondary line 7 which is supplied with a clean gas e.g. compressed air at constant pressure by means of e.g. a fan 8 and an air chamber 9. A pair of three-way/two-way secondary line 7 so as to divide the latter into sections 7a, 7b. Each directional control valve 10a, 10b is controlled by a respective pressure transmitter 11a, 11b via a suitable connection 12a, 12b which may be a pneumatic connection, mechanical connection, or an electric connection in case the valves 10a, 10b are magnetic valves.

As can be seen from FIG. 1, each control valve 10, 10b further regulates the flow through a pertaining branch line 13a, 13b which extends between the associated pressure transmitter and the next succeeding pressure transmitter in upstream direction and is connected to the conveyor line 1 via a plurality of check valves 14 allowing a flow of clean gas only in direction from the branch lines 13a, 13b into the conveyor line 1 but not vice versa. In the nonlimiting example of FIG. 1, the branch line 13b is associated with the pressure transmitter 11b via the control valve 10b and extends essentially to the succeeding pressure transmitter 11a in upstream direction. Although three check valves 14 are shown in FIG. 1 for connection of the branch lines 13a, 13b with the conveyor line 1, it is certainly conceivable to provide a different number of such check valves 14.

Extending parallel to the conveyor line 1 is a further line 15 which contains a fluid at a desired pressure decreasing in downstream direction from the first pressure transmitter to the last pressure transmitter in correspondence to the pressure drop within the conveyor line 1 during normal operation. The beginning of the desired pressure line 15 is connected to the secondary line 7 via a pressure reducing valve 17 which is controlled by a further pressure transmitter 16. By means of the pressure reducing valve 17, the desired pressure at the beginning of the desired pressure line 15 can be adjusted to the pressure prevailing in the conveyor line 1 in the same area without encountering a penetration of bulk material into the desired pressure line 15.

The opposing end of the desired pressure line 15 extends into the separator 3 via a throttle valve 18 so that the desired pressure at the end of the line 15 may be increased in comparison to the pressure at the end of the conveyor line 1. Usually, the desired pressure in line 15 is increased to atmospheric pressure. In this manner, a pressure drop in the conveyor line 1 is detected earlier, and a more sensitive and quicker operation is attained.

Each pressure transmitter 11a, 11b, 16 is connected via a control line 20, 20a, 20b with the desired pressure line 15 and operates as comparator. Accordingly, the pressure transmitters 11a, 11b, 16 may include as schematically indicated—a diaphragm, with one side which represents the actual pressure side being acted upon by the pressure prevailing in the conveyor line 1 and with the other side which represents the desired pressure side being acted upon by the desired pressure prevailing in the line 15 via the respective control line 20, 20a, 20b.

The pressure transmitters 11a, 11b, 16 may be of any suitable type e.g. diaphragm gages or bellows gages.

During normal operation, the bulk material 4 is discharged through the outlet of the container 2 into the conveyor line 1 and transported by the compressed air supplied through line 6. The directional control valves 10a, 10b prevent a flow of compressed air through the branch lines 13a, 13b. In case the bulk material 4 accumulates within the conveyor line 1 so as to clog the latter as indicated at 4a in FIG. 1, the pressure drops within the conveyor line 1 downstream of the clogged area 4a. Thus, the diaphragm of the pressure transmitter 11b is deflected, and the pressure transmitter 11b switches the directional control valve 10b in such a manner that the section 7b of the secondary line 7 is cut off from the supply of compressed air from the air chamber 9, and the branch line 13b is now supplied with compressed air via the section 7a. The compressed air opens the check valves 14 and flows into the conveyor line 1 for dissolving the clogged area 4a.

Turning now to FIG. 2, there is shown a graphical illustration of the pressure prevailing in the various lines and plotted over the length of the lines in connection with the nonlimiting example of FIG. 1 in which clogging of the bulk material 4 occurred in the area 4a. The pressure is indicated on the ordinate while the length of the lines is indicated on the abscissa. $P_N$ represents the constant pressure of the clean gas within the secondary line 7 while PS represents the graph of the desired pressure within the line 15. $P_F$ represents the pressure within the conveyor line 1.

As can be seen from FIG. 2, the pressure $P_F$ drops considerably in the clogged area 4a and falls at a certain point below the desired pressure $P_S$. The pressure difference $\Delta p$ is recognized by the pressure transmitter 11b which thus switches the three-way/two-way directional control valve 10b in such a manner that the clean gas i.e. compressed air is supplied via the branch line 13b and check valves 14 into the conveyor line 1 so as to dissolve the clogged area 4a thereby increasing the pressure above the desired level.

Referring now to FIG. 3, there is shown a schematically simplified view of a second embodiment of an apparatus for pneumatically conveying bulk material in accordance with the present invention. In FIG. 3, same reference numerals have been used for corresponding parts as shown in FIG. 1. The second embodiment differs from the apparatus according to FIG. 1 essentially in the arrangement of the branch lines 13a, 13b which extend between successive pressure transmitters in downstream direction as viewed from the controlling pressure transmitter.

While the invention has been illustrated and described as embodied in an Apparatus for Pneumatically Conveying Bulk Material, it is not intended to be limited to the details shown since various modifications and structural changes may be made without departing in any way from the spirit of the present invention.

What is claimed as new and desired to be protected by Letters Patent is set forth in the appended claims:

1. Apparatus for pneumatically conveying bulk material; comprising:
   a first line for transporting the bulk material
   a second line carrying clean gas at essentially constant pressure;
   valve means for dividing said second line into sections;
   a third line carrying a fluid at a desired pressure which decreases in downstream direction in accordance with the pressure drop in said first line during normal operation;
   pressure-sensing means cooperating with said valve means and operatively connected with said third line for comparing the actual pressure in said first line with the desired pressure in said third line, said pressure-sensing means including a pressure transmitter arranged at the upstream end of said first line;
   connecting means regulated by said valve means and multiply connected to said first line for allowing a communication between said second line and said first line, said pressure-sensing means actuating said valve means upon encountering a pressure drop in said first line so as to allow clean gas to flow from said second line via said connecting means into said first line at a desired area thereof; and
   a pressure reducing valve for connecting the upstream end of said third line with said second line, said pressure reducing valve being controlled by said pressure transmitter.

2. Apparatus as defined in claim 1, and further comprising means for introducing clean gas into said second line at one end thereof, the other end of which being suitably adapted for maintaining the clean gas essentially at constant pressure.

3. Apparatus as defined in claim 1 wherein said valve means includes three-way/two-way directional control valves spaced along said second line.

4. Apparatus as defined in claim wherein said pressure-sensing means includes pressure transmitters, each three-way/two-way directional control valve being controlled by one such pressure transmitter.

5. Apparatus as defined in claim 4, wherein said connecting means includes branch lines each of which defining a third connection to the associated one of said three-way/two-way directional control valves and extending between successive pressure transmitters.

6. Apparatus as defined in claim 5 wherein said connecting means further includes at least one check valve provided in each of said branch lines for allowing a flow of clean gas only in direction from said branch line to said first line.

7. Apparatus as defined in claim 3, and further comprising a throttle valve incorporated in said third line downstream of the last one of said pressure transmitters.

* * * * *